United States Patent
Huang

[11] Patent Number: 6,131,746
[45] Date of Patent: Oct. 17, 2000

[54] POT LID STORING TROUGH

[76] Inventor: Pao Ching Huang, No. 10, Lane 170, Nan Lei Rd., Ho Mei, Chang Hwa, Taiwan

[21] Appl. No.: 09/366,779

[22] Filed: Aug. 4, 1999

[51] Int. Cl.⁷ .................................................. A47G 19/08
[52] U.S. Cl. .................................. 211/41.11; 248/298.1; 248/222.12; 211/94.01
[58] Field of Search ..................... 211/41.11, 41.1, 211/41.2, 94.01, 162, 46; 403/326, 329; 16/96 R

[56] References Cited

U.S. PATENT DOCUMENTS

| | | | |
|---|---|---|---|
| D. 153,115 | 3/1949 | Childs | 211/41.11 X |
| D. 161,899 | 2/1951 | Brooks | 211/41.11 X |
| D. 167,203 | 7/1952 | Grode | 211/41.11 X |
| 3,465,892 | 9/1969 | Taylor | 211/41.11 |
| 4,609,173 | 9/1986 | Belokin | 211/94.01 |
| 4,700,846 | 10/1987 | Schroder | 211/94.01 |
| 4,911,310 | 3/1990 | Raishe et al. | 211/41.2 |
| 5,000,326 | 3/1991 | Vaughn | 211/41.11 |
| 5,011,427 | 4/1991 | Martin | 248/222.11 X |
| 5,207,334 | 5/1993 | Lear | 211/41.11 |
| 5,215,198 | 6/1993 | Sutton | 211/41.2 |
| 5,311,688 | 5/1994 | Aeschbacher et al. | 348/222.11 X |
| 5,392,934 | 2/1995 | Fox | 211/94.01 |
| 5,467,954 | 11/1995 | Wekell | 248/222.11 |
| 5,588,329 | 12/1996 | Nedachi | 403/326 |
| 5,624,168 | 4/1997 | Licciardello, Sr. | 211/94.01 |
| 5,735,511 | 4/1998 | Stocker et al. | 403/329 |
| 5,820,091 | 10/1998 | Kutscher | 248/221.11 |
| 5,848,855 | 12/1998 | Roossien | 403/329 |

Primary Examiner—Daniel P. Stodola
Assistant Examiner—Jennifer E. Novosad
Attorney, Agent, or Firm—Dougherty & Troxell

[57] ABSTRACT

A pot lid storing trough consists of a bottom member and a case member movably assembled on the bottom member. The bottom member may be secured on a horizontal wall or a vertical wall in a cupboard or a cabinet, or on a wall of a kitchen, depending on the condition, with an upper open side of the case member always facing upward for putting in or taking out pot lids.

3 Claims, 6 Drawing Sheets

POT LID STORING TROUGH

BACKGROUND OF THE INVENTION

This invention relates to a pot lid storing trough, particularly to one possible to be secured on a horizontal wall or a vertical wall in a cupboard or a cabinet or a wall of a kitchen.

A known conventional pot lid storing trough 10 shown in FIGS. 1, 2 and 3, includes a bottom member 11 and a case member 12 as main components combined together.

The bottom member 11 is provided with a lengthwise recess 111 formed in an upper surface, two holes 112 spaced apart in the recess 111 for screws 13 to secure the bottom member 11 on a horizontal wall 21 of a cupboard or a cabinet 20 as shown in FIG. 3. Further, the bottom member 11 has a guide groove 113 respectively near the two lengthwise side edges, a guide sloped face 114 respectively projecting from a center top of each lengthwise guide groove 113.

The case member 12 has a rectangular cross-section, two storing cavities 121 lengthwise provided with an open upper side for putting in or taking out pot lids, a bottom wall 122 provided with two lengthwise parallel rails 123 to fit in the recess 111 of the bottom member 11, two projecting keys 124 spaced apart on the two bottom sides 122 fitting with the two projecting sloped faces 114 when the case member 12 is assembled with the bottom member 11 to limit sliding movement of the case member 12 relative to the bottom member 11.

However, though the known conventional pot lid storing trough has function of storing pot lids 30, it still has disadvantages described below.

The bottom member 11 can only be fixed on a horizontal wall 21 of a cupboard or a cabinet 20, and is impossible to be fixed with a vertical plate 22. But if a large number of kitchen utensils are stored on the horizontal wall 21, a part of kitchen utensils have to be moved out to leave some space on the horizontal wall 21 for fixing the conventional pot lid storing trough thereon.

SUMMARY OF THE INVENTION

This invention has been devised to offer a pot lid storing trough that is possible to be fixed on a horizontal wall or on a vertical wall of a cupboard or a cabinet to let the upper open side of the storing trough always face upwardly, utilizing the space most effectively in the cupboard or the cabinet.

The feature of the invention is a bottom member and a case member movably assembled on the bottom member, and the bottom member has two lengthwise parallel slide grooves to receive two lengthwise rails formed lengthwise under the bottom of the case member or formed on an outer side. Then the bottom member may be cured on a horizontal wall or a vertical wall in a cupboard or a cabinet or a wall of a kitchen, permitting the open upper side of the case member always facing upward for putting or taking out pot lids.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
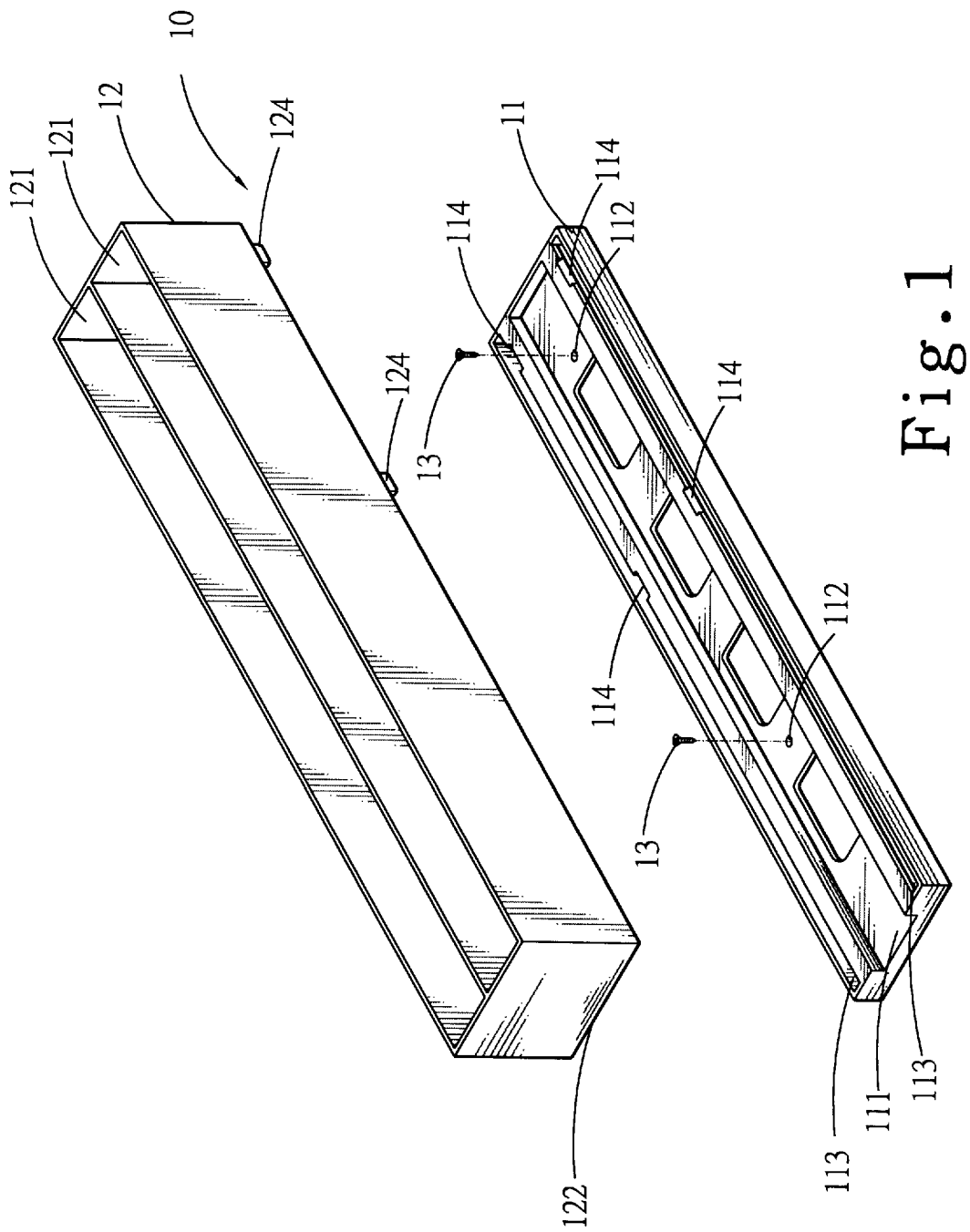
FIG. 1 is an exploded perspective view of a known prior art pot lid storing trough.
Figure 3:
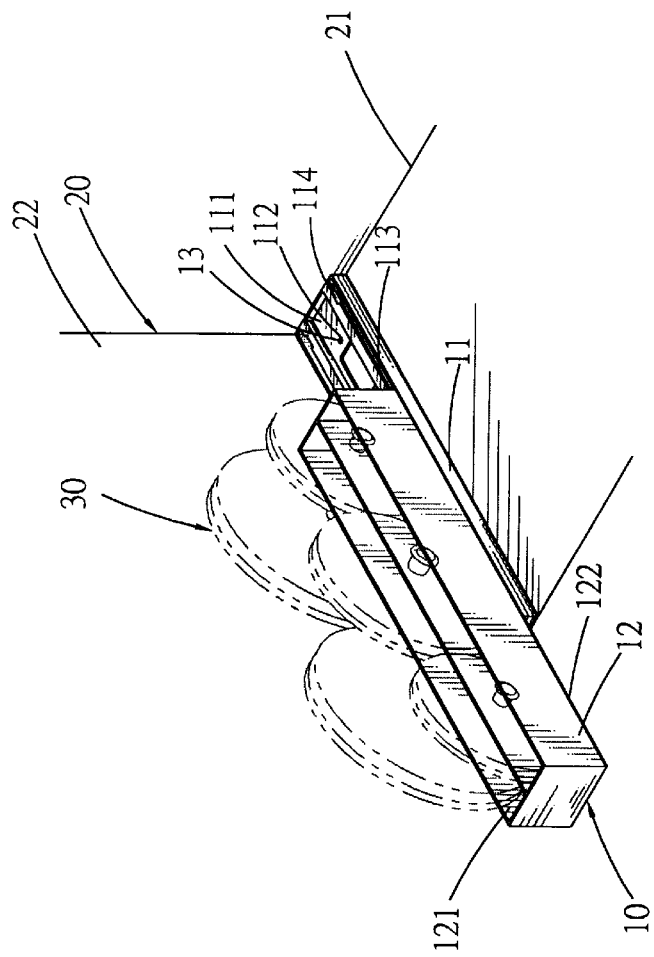
FIG. 3 is a perspective view of the known prior art pot lid storing trough.
Figure 2:
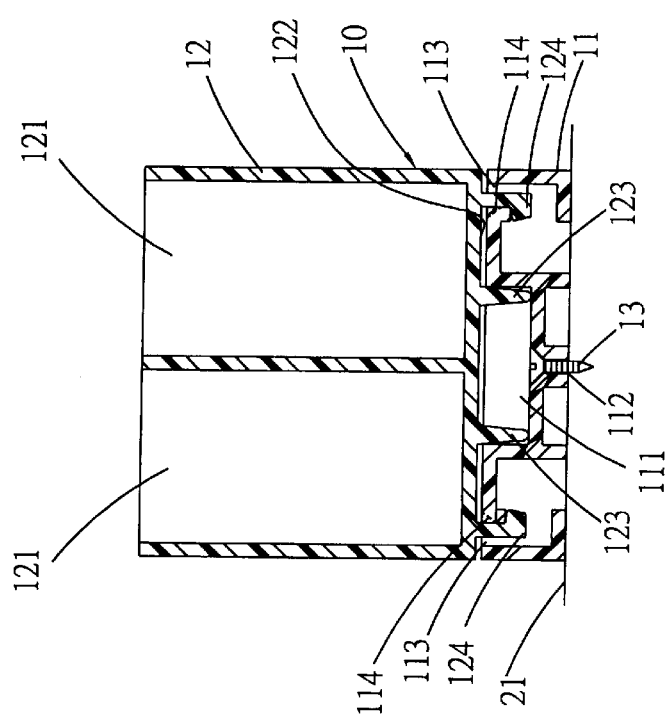
FIG. 2 is a cross-sectional view of the known prior art pot lid storing trough.
Figure 4:
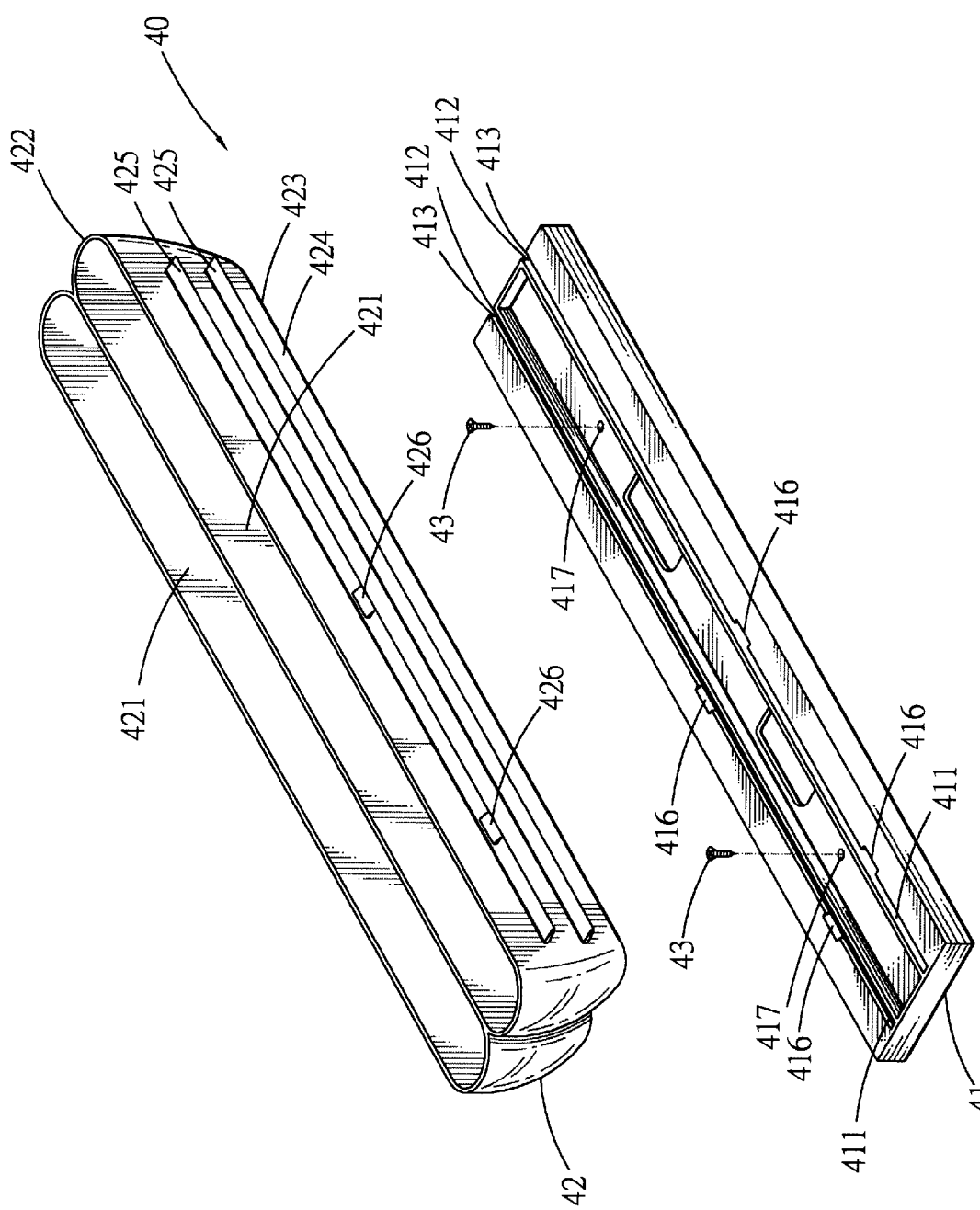
FIG. 4 is an exploded perspective view of a pot lid storing trough in the present invention.
Figure 5:
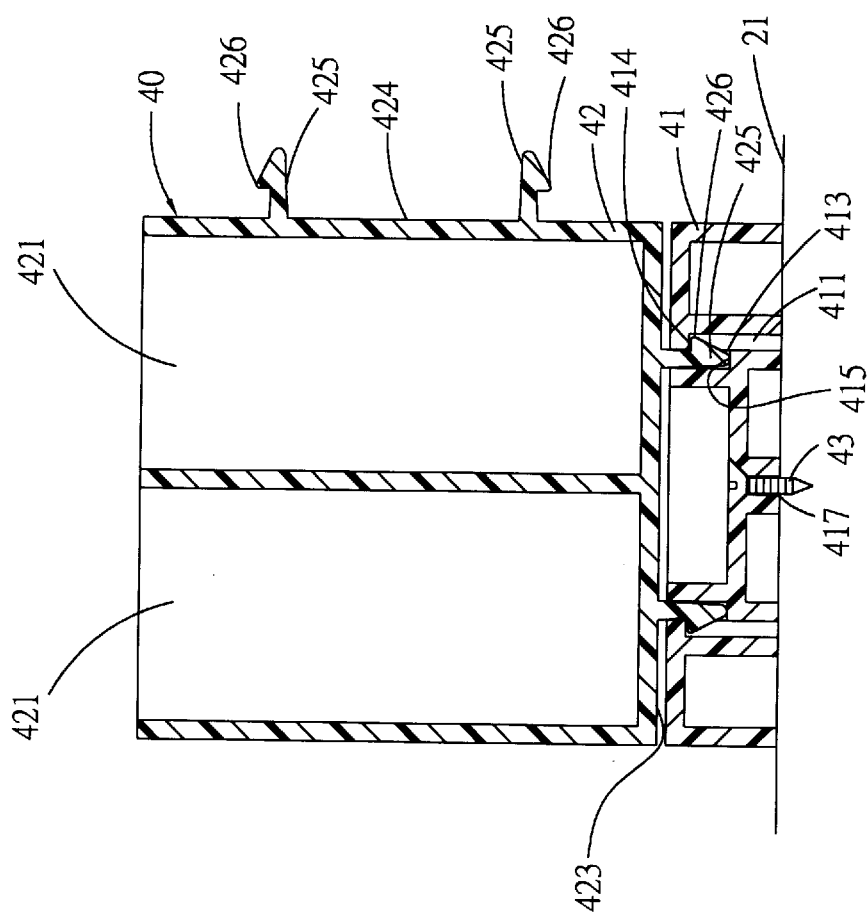
FIG. 5 is a cross-sectional view of the pot lid storing trough in the present invention.

A preferred embodiment of a pot lid storing trough 40 in the present invention, as shown in FIGS. 4 and 5, includes a bottom member 41 and a case member 42 movably assembled on the bottom member.

The bottom member 41 is made integral of plastic, shaped as a long rectangular plate, and having two lengthwise parallel slide grooves 411 with one end 412 open and the other end closed and a stop member 413 beside the open end 412, a lengthwise L-shaped recess 414 formed in an upper end of a wall of each slide groove 411, a lengthwise L-shaped receiving corner 415 respectively formed in the slide groove 411. Further, bottom member 41 has two projecting sloped faces 416 spaced apart above the L-shaped recess 414, and two two holes 417 space apart in an intermediate portion for screws 43 to secure the bottom member 41 on a horizontal wall or a vertical wall of a cupboard or cabinet.

The case member 42 is provided with two lengthwise parallel storing cavities 421 separated with a vertical wall, having two lateral curved sides 422 extending to the bottom wall 423, two parallel lengthwise rails 425 formed respectively under the bottom wall 423 and lengthwise on an outer side wall to fit in the two parallel slide grooves 411. Further two keys 426 are provided on the rails 425 to fit between the L-shaped recess 414 and the L-shaped receiving corner 415. Then the case member 42 may slide along the bottom member, with the rails 425 fitting and moving in the slide grooves 411, and be stopped by the stop member 413 of the bottom member 41 stopping the keys 426, preventing the case member 42 from falling off the bottom member 41.

Next, how to assemble and use the pot lid storing trough in the invention is to be described below.

Figure 7:
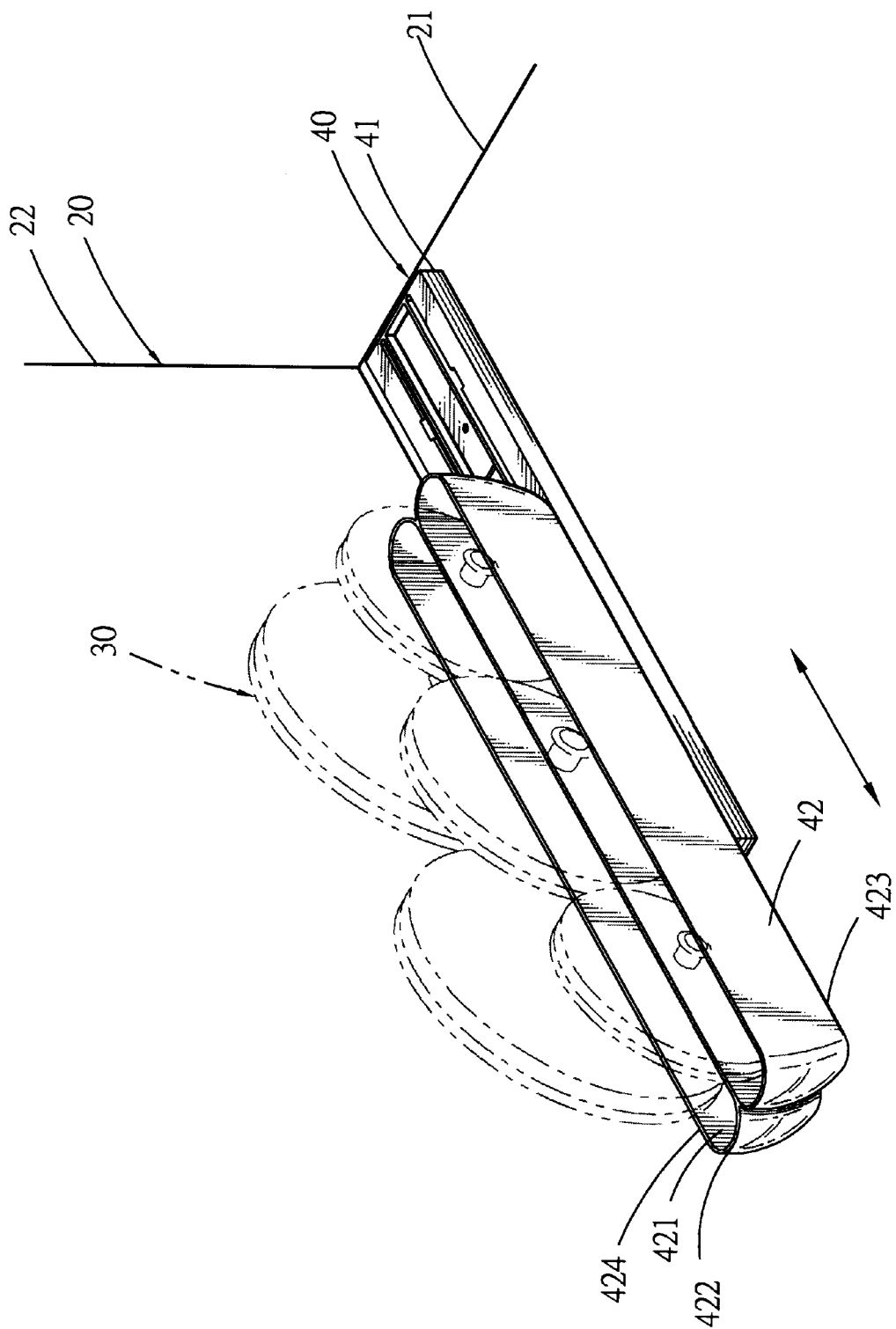
FIG. 7 is a perspective view of the pot lid storing trough fixed on a horizontal plate for use in the present invention; and, FIG. 8 is a perspective view of the pot lid storing trough fixed on a vertical plate above a horizontal plate in the present invention.

One way of using the pot lid storing trough in a cupboard or a cabinet 20 is to be fixed on a horizontal wall of the cupboard or the cabinet 20 in case of sufficient space therein, as shown in FIGS. 5 and 7. Then the bottom member 41 is secured on the horizontal wall 21 of the cupboard or the cabinet 20, and then the case member 42 is combined with the bottom member 41, with the rails 425 fitted in the slide grooves 411, with the keys 426 inserted in the slide grooves 411 along the projecting sloped faces 416 and then engaging the L-shaped recesses 414. Then the storing cavities 421 may face upward, ready for pot lids to be placed in the storing cavities 421, with the case member 42 movable relative to the bottom member 41 for easily taking off a pot lid if necessary.

Figure 6:
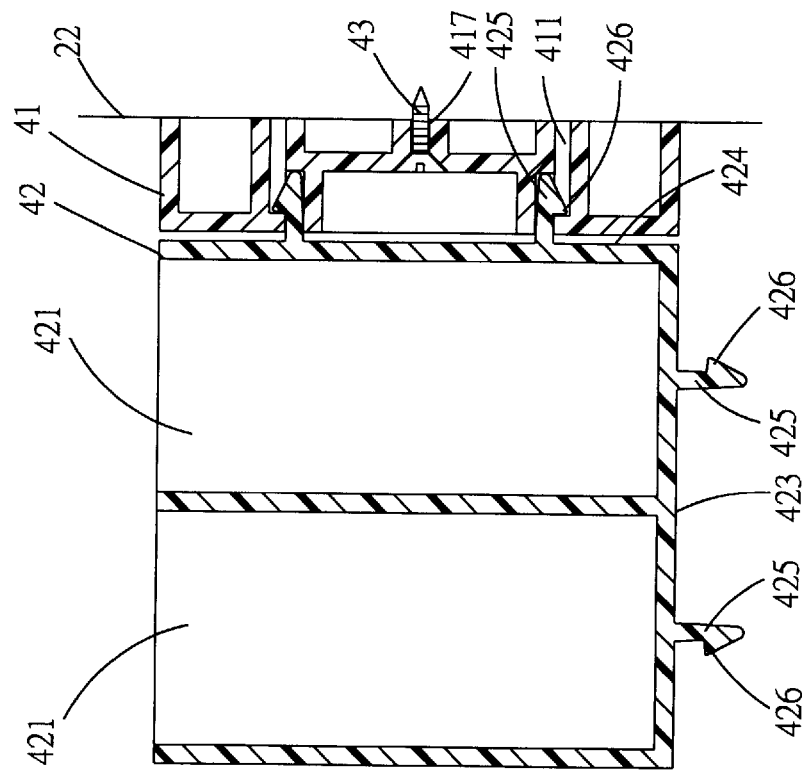
FIG. 6 is a cross-sectional view of the pot lid storing trough fixed on a vertical plate in the present invention.
Figure 8:
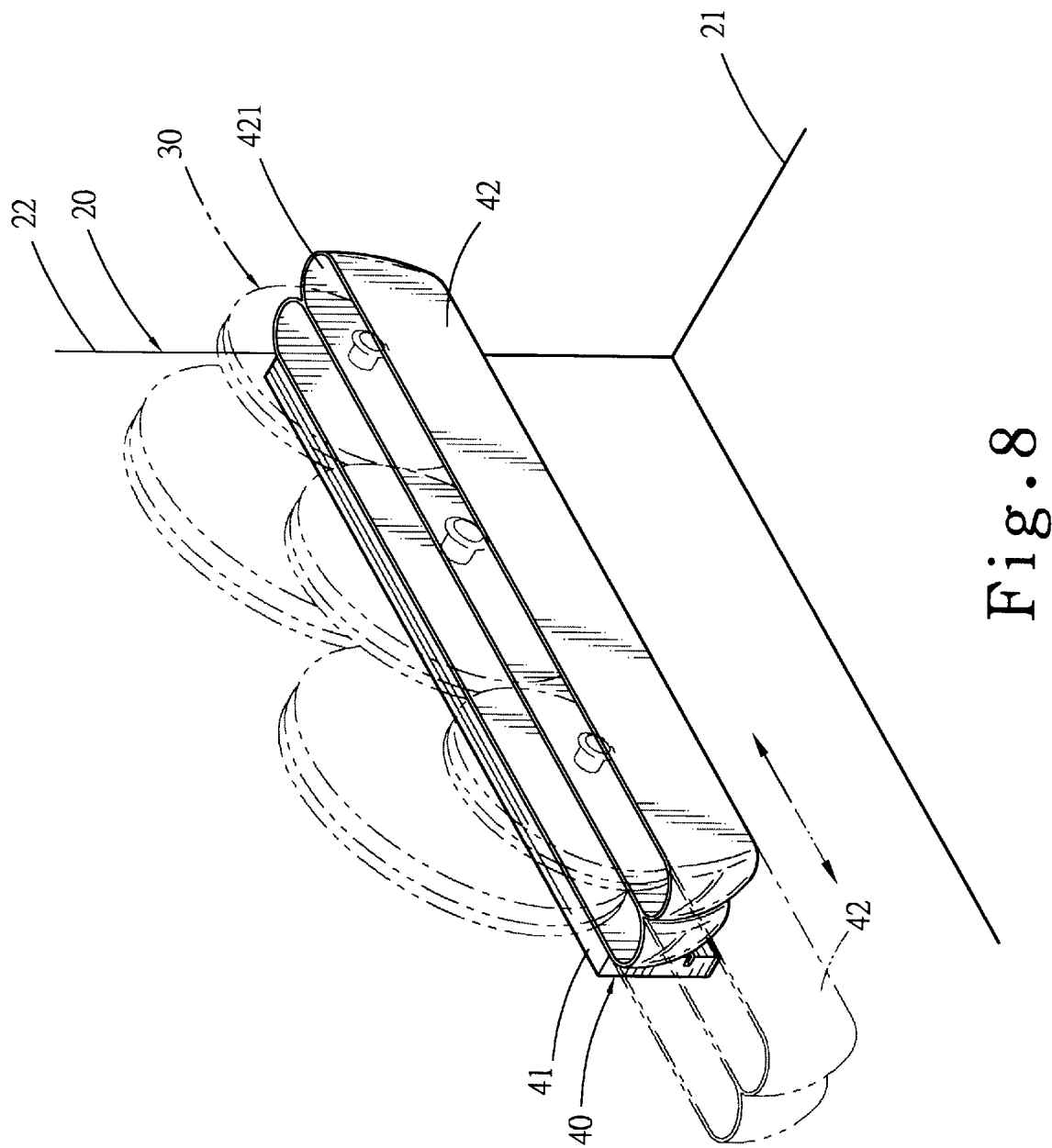

Another way of using the pot lid storing trough is to fix the bottom member 41 on a vertical wall of a cupboard or a cabinet, as shown in FIGS. 6 and 8, if the inner space of the cupboard or the cabinet is not sufficient. Then the case member 42 is assembled with the bottom member 41, with the two parallel rails 425 on the outer side wall 424 fitted in the two slide grooves 411, with the two keys 426 fitted in the slide grooves 411 along the sloped faces 416 and then engaging the L-shaped recesses 414. Then the storing cavities 421 may face upward for pot lids to be placed therein, with the case member 42 also movable relative to the bottom member. Therefore, there is some space between the bottom member 41 and the horizontal wall of the cupboard or the cabinet for placing kitchen utensils.

Provided a cupboard or a cabinet has its inner space occupied fully, the pot lid storing trough can be fixed on a wall beside a kitchen sink or an oven. Thus the pot lid storing trough may be convenient to be fixed somewhere according to the condition of a cupboard, a cabinet or the condition of a kitchen.

It is worth mentioning that the pot lid storing trough in the invention can be fixable depending on the condition of a kitchen, and the curved sides 422 of the case member 42 conform to the shape of pot lids. The keys 426 are preferably formed integral with the rails 425 so as to have more strength.

While the preferred embodiment of the invention has been described above, it will be recognized and understood that various modifications may be made therein and the appended claims are intended to cover all such modifications which may fall within the spirit and scope of the invention.

What is claimed is:

1. A pot lid storage trough comprising:
    a) a bottom member having an elongated configuration with a surface having two lengthwise parallel grooves therein, a first end of each groove being open and a second end of each groove being closed, the bottom member also having a stop member formed beside the open end of each groove and a sloped face portion adjacent to each of the grooves;
    b) a case member having an elongated configuration with two lengthwise parallel storing cavities, the case member having a bottom wall and opposite side walls;
    c) a first pair of parallel rails extending downwardly from the bottom wall of the case member and extending lengthwise along the case member, each rail having a key thereon; and
    d) a second pair of parallel rails extending outwardly from one of the opposite side walls of the case member, and extending lengthwise along the case member, each rail having a key thereon, whereby one pair of the first and second pairs of rails slidably engages the grooves in the bottom member to thereby slidably attach the case member to the bottom member such that the case member may be supported by the bottom wall having the first pair of rails, or by the side wall having the second pair of parallel rails.

2. The pot lid storage trough of claim 1 wherein each of the lengthwise parallel grooves has an L-shaped cross-sectional configuration configured to be engaged by the keys of the parallel rails.

3. The pot lid storage trough of claim 1 further comprising:
    a) a middle dividing wall extending lengthwise along the case member; and
    b) curved end walls connecting the middle dividing wall to each of the opposite side walls at ends of the case member.

* * * * *